United States Patent

[11] 3,623,080

[72] Inventor Alfred D. Scarbrough
Northridge, Calif.

[21] Appl. No. 160
[22] Filed Jan. 2, 1970
[45] Patented Nov. 23, 1971
[73] Assignee The Bunker-Ramo Corporation
Oak Brook, Ill.

[54] SELF-ENCODING KEYBOARD EMPLOYING EDDY CURRENT SHORTING
21 Claims, 13 Drawing Figs.

[52] U.S. Cl. .......... 340/365, 235/145
[51] Int. Cl. .......... H03k 13/00
[50] Field of Search .......... 340/365, 174 AB, 174 EC; 179/90 K; 235/145, 146

[56] References Cited

UNITED STATES PATENTS

| | | | |
|---|---|---|---|
| 3,160,875 | 12/1964 | Bernard .......... | 340/365 |
| 3,210,734 | 10/1965 | Andrews et al. .......... | 340/365 |
| 3,495,236 | 2/1970 | Mathamel .......... | 340/365 |

*Primary Examiner*—Richard Murray
*Assistant Examiner*—Peter M. Pecori
*Attorney*—Frederick M. Arbuckle

ABSTRACT: A self-encoding keyboard which employs eddy current shorting effects for generating coded digital electrical signals representative of actuated keys. Each key includes a metal element which upon actuation of the key is brought into close proximity to a corresponding group of stacked printed circuit windings so as to produce an eddy current shorting effect which is detected and used to produce a group of coded digital output signals uniquely representative of the actuated key.

INVENTOR
ALFRED D. SCARBROUGH
BY
Nathan Cass
ATTORNEY

INVENTOR
ALFRED D. SCARBROUGH
BY
Nathan Cass
ATTORNEY

INVENTOR
ALFRED D. SCARBROUGH
BY Nathan Cass
ATTORNEY

SELF-ENCODING KEYBOARD EMPLOYING EDDY CURRENT SHORTING

BACKGROUND OF THE INVENTION

This invention relates generally to keyboards and the like, and to means and methods for providing electrical signals representative of actuated keys.

It will be recognized that various approaches are known for designing keyboard apparatus. In one conventional approach, a keyboard construction is provided which operates based on magnetic coupling principles for producing coded electrical output signals representative of actuated keys. While such a magnetic keyboard has the advantage of eliminating the need for mechanical switching means, known structures have the disadvantage of requiring relatively expensive and/or complex structures and circuit arrangements.

BRIEF DESCRIPTION OF THE PRESENT INVENTION

In accordance with the present invention, a novel keyboard is provided which operates on magnetic coupling principles, but yet is capable of being constructed in a remarkable simple and inexpensive manner. This is accomplished by employing eddy current shorting principles in a novel manner which permits generating electrical output signals representative of actuated keys using noncritical, simply providable key-operating members, and without the need of providing special magnetic elements for the keys. The present invention also provides a novel means for employing eddy current shorting principles for generating digitally coded output signals representative of actuated keys.

The specific nature of the invention as well as other objects, features, advantages and uses thereof will become apparent from the following description of a typical exemplary embodiment of the invention taken in conjunction with the accompanying drawings in which.

Like characters refer to like elements throughout the drawings.

Figure 1:
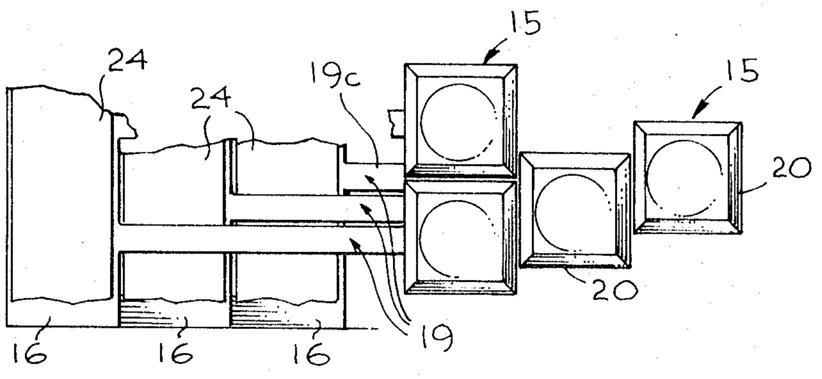
FIG. 1 is a fragmentary top view of a keyboard in accordance with the invention.
Figure 2:
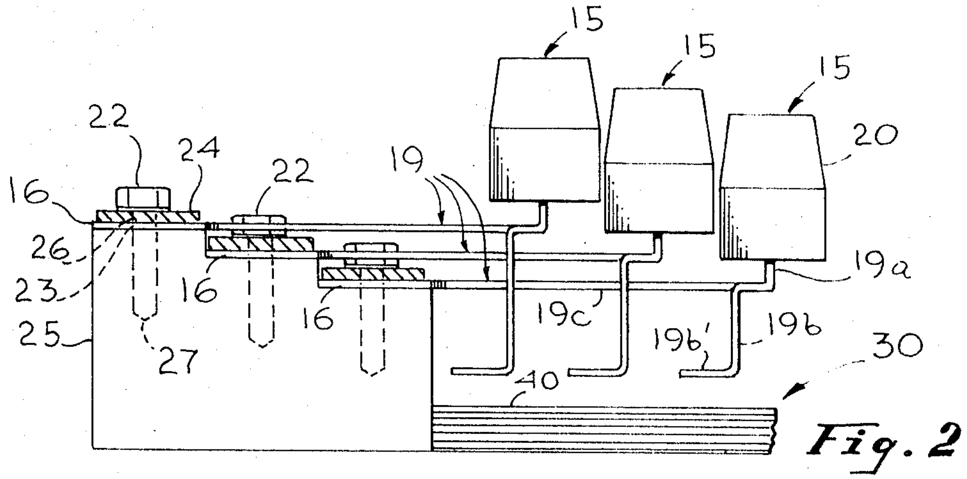
FIG. 2 is a side view of the keyboard of FIG. 1.

Referring to FIGS. 1 and 2, illustrated therein is a fragmentary portion of a typical keyboard in accordance with the invention. It will become apparent from the description to be provided herein that the present invention is applicable to a wide variety of keyboard arrangements with differing numbers of keys.

Figure 3:
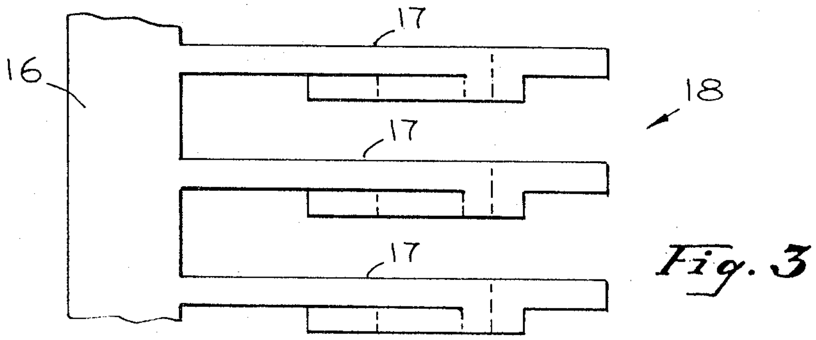
FIG. 3 is a fragmentary view illustrating a stamping of sheet spring stock which when bent along the indicated dashed lines forms the operating members for one of the rows of keys for the keyboard of FIGS. 1 and 2.
Figure 4:
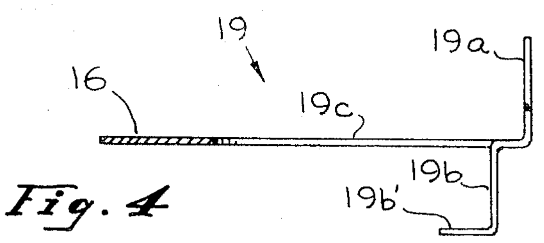
FIG. 4 is a side, partially cross-sectional view illustrating the resulting shape of each key operating member after bending of the stamping of FIG. 3.

The basic construction and arrangement of the keyboard of FIGS. 1 and 2 will best be understood from a consideration of FIGS. 3 and 4. FIG. 3 illustrates a stamping 18 of sheet spring stock, preferably of beryllium copper, from which the operating members 19 (FIGS. 2 and 4) of a typical row may be formed, there being one such stamping 18 for each row of keys of the keyboard. THe stamping 18 of FIG. 3 comprises a generally rectangular portion 16 having perpendicularly depending elongated spaced parallel portions 17 which when bent along the indicated dashed lines form the commonly connected key operating members 19 of a row, as illustrated by the side view of FIG. 4.

It will be seen that each operating member 19 comprises an upper portion 19*a* (FIG. 4) which receives an actuating cap 20 (FIGS. 1 and 2) in a conventional manner, a lower portion 19*b* (FIGS. 2 and 4) having a generally right-angular shape with a horizontal element 19*b*′ which is used to provide eddy current shorting as will hereinafter be explained, and an elongated horizontal central portion 19*c* (FIGS. 1, 2, and 4) for coupling to the common portion 16 (FIGS. 1 to 4) of its respective row. The thus formed rows of operating members 19 are assembled as shown in FIGS. 2 and 3 with their supporting portions 16 rigidly affixed to respective steps of a keyboard base 25 by respective rigid plates 24 (FIGS. 1 and 2) disposed thereover and secured by screws 22 (FIG. 2) passing through appropriately located aligned holes 23, 26 and 27 respectively provided in the portions 16, the plates 24 and the base 25.

Next to be considered is the manner in which the invention may typically employ eddy current shorting principles for generating a unique group of digitally coded output signals in response to the actuation of each key of a keyboard. As will be seen from FIG. 2, an encoding means 30 is provided beneath the keys 15. When a key 15 is actuated, such as by manual depression, the horizontal element 19*b*′ of its respective operating member 19 is moved downwardly into a position of close proximity to a respective area of the top surface of the encoding means 30, there being a like but different respective area for each key of the keyboard. Because the operating members 19 are formed from spring sheet stock, such as beryllium copper, it will be understood that a depressed key will spring back to its original position when the depressing force is removed.

FIGS. 5 to 9 illustrate the nature of five encoding wafers 31 to 35 which may be stacked to form an encoding means 30 (FIG. 2) for a keyboard having, for example, 16 keys. Each of the encoding wafers 31 to 35 may typically comprise a printed circuit board formed of an insulative substrate 39 having a unique predetermined conductive pattern of 16 interconnected windings 31*a* to 35*a* respectively provided thereon. The windings on all of the wafers have the same respective positions, and each of the 16 windings on a wafer corresponds to a respective one of the 16 keys of the keyboard. Although the windings on the encoding wafers 31 to 35 of FIGS. 5 to 9 are all illustrated as having only a single turn, it is to be understood that multiple-turn windings may also be employed. It is also to be understood that other encoding arrangements may be employed for which a plurality of windings may be provided on each wafer for each key of the keyboard.

Figure 10:
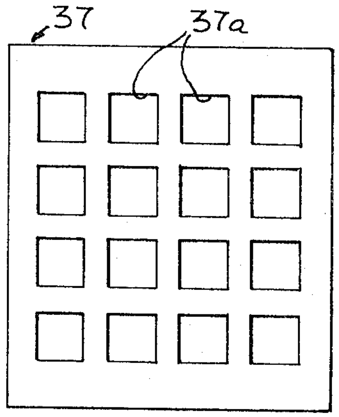
Figure 11:
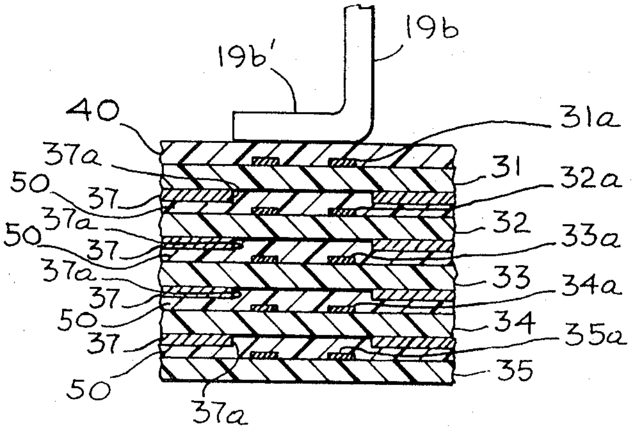
FIG. 11 is a fragmentary cross-sectional view showing how the encoding wafers of FIGS. 5 to 10 may be stacked to form an encoding means, and also showing the resulting position of an eddy current shorting element when its respective key is depressed.

As shown in FIG. 11, the encoding wafers 31 to 35 are stacked with their respective like-positioned windings aligned and with a metal shielding wafer 37 (FIG. 10) preferably interposed between each adjacent pair for shielding purposes. Each metal shielding wafer 37 has openings 37*a* concentric with and of greater size than the windings on the wafers so as to permit magnetic coupling only among each group of vertically aligned windings. Dielectric material 50 serves to provide insulation for the wafers 37. FIG. 11 also illustrates the position of the eddy current shorting element 19*b*′ of a depressed key relative to a respective group of vertically aligned windings when the key is depressed. The thicknesses of the wafers in FIG. 11 are exaggerated for greater clarity of illustration. The encoding means 30 is also provided with a top layer 40 of suitable insulative material so as to protect the topmost encoding wafer from possible shorting.

Next to be considered is the specific manner in which encoding is typically provided in response to key actuation for the exemplary embodiment of the invention being described herein. Basically, encoding is obtained as a function of the relative polarities provided for the 16 windings on each of the encoding wafers 31 to 35, the arrows on the windings indicating their respective polarities. The winding 31*a* of the wafer 31 (FIG. 5) serve as drive windings, while the windings 32*a* to 35*a* on the respective wafers 32 to 35 (FIGS. 6 to 9) serve as sense windings. The drive windings 31*a* of the wafer 31 are connected to each other and to a continuously running pulse generator 44 and line matching impedance 46 so that each drive winding has the same polarity, whereby to cause each drive winding to generate a like polarity magnetic field in response to each pulse from the pulse generator 44. The respective sense windings 32*a* to 35*a* on each of the other wafers 32 to 35 are connected to each other and to a respective wafer-sensing means 47 and line matching impedance 46 so that a unique combination of sense winding polarities is provided for each wafer.

At this point in the description it may be noted that conventional techniques may be employed for connecting the windings of the wafer 31 to the pulse generator 44 and line matching impedance 46 (FIG. 5), and from the windings of the wafers 32 to 35 to the respective sensing means and line matching impedances 46 (FIGS. 6 to 9). Conventional techniques may also be employed for providing the jumper 38 shown on the wafers 32 to 35 for connecting overlapping portions of the interconnection circuitry.

Continuing with the description of the encoding means, it will be evident from FIGS. 6 to 9 that half of the sense windings on each of the wafers 32 to 35 have one polarity and the other half the opposite polarity. Accordingly, when no key of t e keyboard is actuated, a pulse applied to the drive windings of the wafer 31 (FIG. 5) from the pulse generator 44 will cause an equal number of like-amplitude positive and negative pulses to be induced in the sense windings of each wafer so that essentially no resultant signal is coupled to any of the wafer-sensing means 47. It will be understood that the particular interconnection arrangements shown for connecting the windings of the wafers 31 to 35 have been chosen to reduce noise and minimize undesired couplings. It will also be understood that the sensing means 47 may be of conventional form, and preferably includes threshold means for rejecting signals having amplitudes below a predetermined threshold level so as to reject unwanted noise.

With reference now to FIGS. 2 and 11, it will be understood that, when a key 15 is depressed, the eddy current shorting element 19*b'* thereof is brought into close proximity to a respective group of vertically aligned drive and sense windings on the wafers of the encoding means 30. The relative dimensions of the element 19*b'* and its respective windings is chosen to be such that sufficient eddy current shorting is produced as a result of the proximity of the element 19*b'* so as to significantly reduce the amplitude of the pulses induced in the respective sense windings from the respective drive winding in response to a pulse from the pulse generator 44. As a result, equal numbers of positive and negative pulses will no longer be induced in the sense windings of each wafer, as occurred when no key was actuated. Instead, a resultant pulse will be coupled to each wafer-sensing means 47 having a polarity determined by the polarity of the respective wafer-sense winding. The relative polarities provided for the sense windings on each of the wafers 32 to 35 are chosen so that the resulting pulses applied to the wafer-sensing means 47 constitute a pulse combination uniquely representative of the depressed key, and which pulse combination can be sensed in a conventional manner and then fed to appropriate utilization means.

The particular exemplary encoding scheme employed in the embodiment of the invention is a straightforward binary system, as will shortly become apparent. For the purposes of this discussion, it will be assumed that a sense winding having a clockwise polarity will, when its respective key is actuated, cause a resultant positive pulse to be coupled to its respective wafer-sensing means 47 in response to each pulse from the pulse generator 44, or a resultant negative pulse if the sense winding has a counterclockwise polarity. It will arbitrarily be assumed that such a resultant positive pulse coupled to a sensing means 47 corresponds to a binary "1," and that such a resultant negative pulse coupled to a sensing means 47 corresponds to a binary "0."

Figure 12:
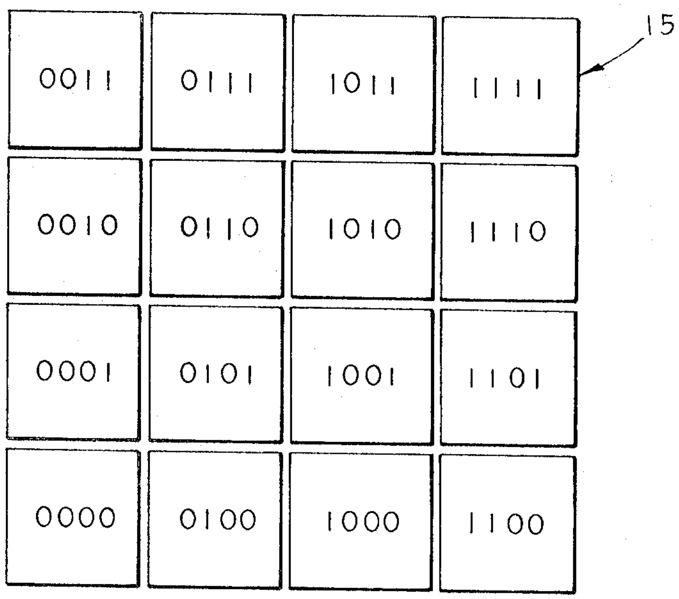
FIG. 12 is a schematic plan view illustrating a typical binary encoding which may be provided for the 16 keys of a keyboard using the encoding wafers illustrated in FIGS. 5 to 9.

It will be understood from a study of the polarities of the sense windings on the wafers 32 to 35 of FIGS. 6 to 9 that, using the above assumptions, each of the 16 keys of the keyboard will upon actuation produce a unique four-digit binary number as indicated on each key in FIG. 12. The binary digits of each such four-digit number are determined by the polarities of the respective sense windings, the least significant binary digit is determined by the polarity of the respective sense winding of the wafer 32, the most significant binary digit is determined by the polarity of the respective sense winding of the wafer 35, and the two intermediate binary digits proceeding from the least to the most significant digits are determined by the polarities of the respective sense windings of the wafers 33 and 34, respectively.

Figure 5:
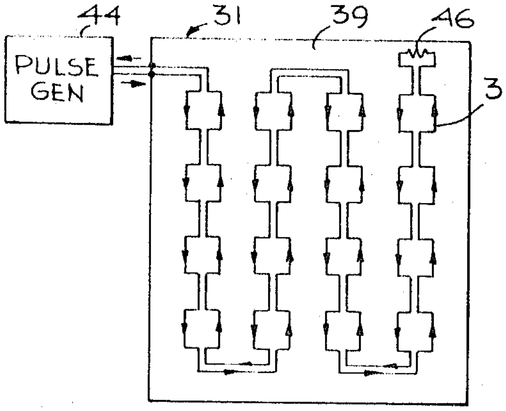
FIGS. 5 to 10 are schematic views illustrating the construction and arrangement of the encoding wafers of a typical keyboard encoding means in accordance with the invention.
Figure 6:
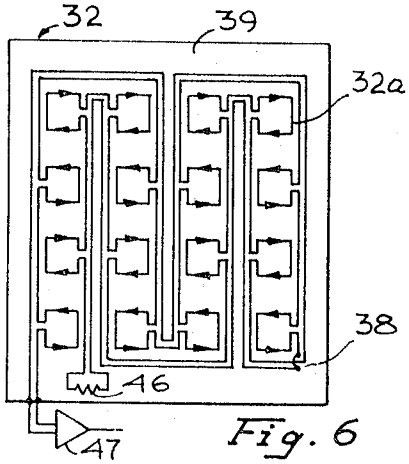
Figure 7:
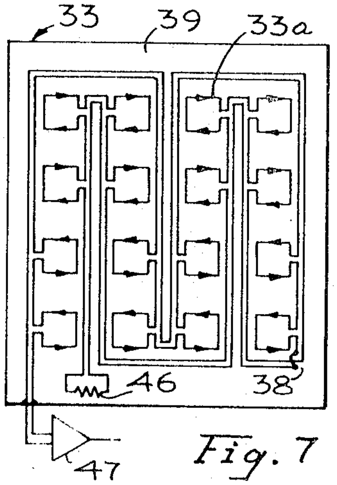
Figure 8:
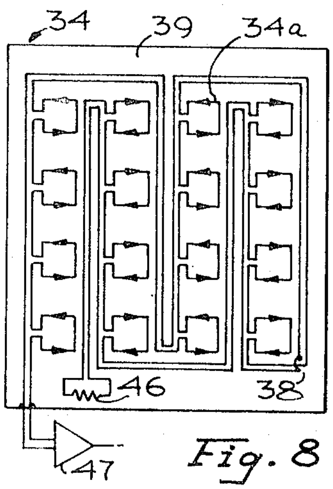
Figure 9:
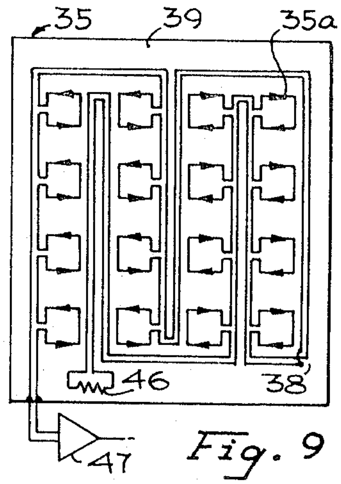

An example of typical operation will now be provided. It will be remembered that, when no key of the keyboard is depressed, substantially no resultant signal is coupled to any of the wafer-sensing means 47 (FIGS. 6 to 9) in response to pulses from the pulse generator 44, because equal numbers of positive and negative pulses are induced into the sense windings of each of the wafers 32 to 35 from the respective drive windings of the wafer 31 (FIG. 5). For the purposes of this example, it will be assumed that the key in the extreme lower right position of the keyboard illustrated in FIG. 12 is actuated. It will be seen from FIG. 12 that this key corresponds to the binary number 1100. Actuation of this key causes the respective eddy current shorting element 19*b'* thereof (FIGS. 2 and 11) to be brought into close proximity to the surface 40 of the encoding means 30 over the corresponding extreme lower right drive and sense windings of the encoding wafers.

As a result, each pulse from the pulse generator 44 (FIG. 5) will cause a resultant pulse to be coupled to each wafer sensing means 47 (FIGS. 6 to 9) having a polarity determined by the polarity of the sense winding in the extreme lower right position of each wafer. It will be noted from FIGS. 6 to 9 that the extreme lower right sense windings of the wafers 32 and 33 are counterclockwise, while those of the wafers 34 and 35 are clockwise. Consequently, in accordance with the previous assumptions made herein, such polarities will cause positive and negative pulses to be applied to the wafer-sensing means 47 which correspond to the binary number 1100, as illustrated on the extreme lower right key in FIG. 12.

Although the invention has been described in connection with a particular exemplary embodiment thereof, it is to be understood that the invention is subject to a wide range of variations, modifications and extensions in construction, arrangement, operation and use without departing from the spirit of the invention.

For example, the invention can be extended to provide additional information, such as an indication that more than one key has been simultaneously depressed. This condition can be detected by including conventional means in the sensing means 47 (FIGS. 6 to 9) for monitoring the amplitudes of the pulses coupled thereto from the sense windings of the wafers 32 to 35, since these pulse amplitudes contain the necessary information to make such a determination. For example, the fact that two keys are simultaneously depressed can readily be detected since, in such a situation, at least one sensing means 47 will receive substantially no resultant signal in response to pulses from the pulse generator 44.

Figure 13:
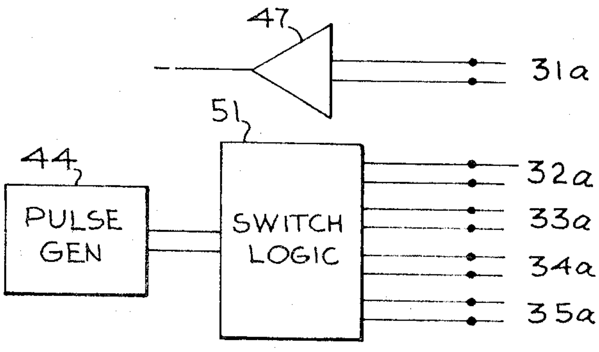
FIG. 13 is a schematic electrical circuit diagram illustrating a possible modification of the invention.

Also, the manner in which the encoding wafers 31 to 35 (FIGS. 5 to 9) are employed for encoding is subject to many variations. For example, FIG. 13 illustrates a modified embodiment in which the windings of the wafers 32 to 35 (FIGS. 6 to 9) are used as drive windings instead of as sense windings, while the windings of the wafer 31 (FIG. 5) are used as sensed windings instead of as drive windings. In such a modification, a single sensing means 47 is provided for the windings of the wafer 31, and the pulse generator 44 is now employed for use of the windings of the wafers 32 to 35 to sequentially apply pulses thereto under the control of conventional switch logic 51. The switch logic 51 causes pulses from the pulse generator 44 to be sequentially applied to the windings of the wafers 32 to 35 so that only one wafer receives a pulse at any one time.

The operation of the modified embodiment of FIG. 13 will accordingly be understood to be such that, when no key is actuated, the application of a pulse from the pulse generator 44 to the windings of any one of the wafers 32 to 35 causes substantially no resultant pulse to be coupled to the sensing means 47, since each of the wafers 32 to 35 contains an equal number of windings of both polarities. However, when a key is actuated, the eddy current shorting produced on the respective windings of the wafers 32 to 35 will cause a resultant pulse to be coupled to the sensing means 47 in response to each pulse of the pulse generator 44, the polarity of each such resultant pulse being determined by the polarity of the respective winding corresponding to the depressed key on the wafer to which the generator pulse is applied. It will thus be evident that, for the modification of FIG. 13, the actuation of a key will cause resultant pulses to be coupled to the sensing means 47 corresponding to the same unique four-digit binary number indicated in FIG. 12, except that the resultant pulses are now sequentially produced, rather than simultaneously as in the previously described embodiment.

It will also be evident that, although the encoding means illustrated in FIGS. 6 to 10 and the keyboard shown in FIG. 13 correspond to a rectangular row-column arrangement of the keys, any other suitable keyboard arrangement may also be employed, such as the staggered arrangement suggested in FIG. 1.

The above examples of possible modifications and variations are by no means exhaustive and the present invention is to be considered as including all possible modifications and variations coming within the scope of the invention as defined in the appended claims.

The embodiments of the invention in which an exclusive property or privilege is claimed are defined as follows:

1. In apparatus for encoding information,
a plurality of actuatable keys,
a plurality of winding means respectively corresponding to said keys,
eddy current shorting means responsive to actuation of a key for causing eddy current shorting to occur with respect to the winding means corresponding thereto, and
means responsive to the occurrence of eddy current shorting in a winding means for producing an electrical output uniquely representative of the key corresponding thereto.

2. The invention in accordance with claim 1,
wherein said eddy current shorting means includes an eddy current shorting element for each key operable to be moved into proximity to a respective winding means when a key is actuated.

3. The invention in accordance with claim 2,
wherein each eddy current shorting element includes a metal member mechanically coupled to its respective key.

4. The invention in accordance with claim 2,
wherein each of said plurality of winding means includes a corresponding plurality of windings.

5. The invention in accordance with claim 4,
wherein said plurality of winding means are disposed in a plurality of adjacent planes with the plurality of windings corresponding to each winding means being distributed among said planes and located in close proximity to one another.

6. The invention in accordance with claim 4,
wherein said apparatus includes driving means and sensing means, and
wherein at least one of each corresponding plurality of windings is a drive winding coupled to said driving means and at least one other one is a sense winding coupled to said sensing means.

7. The invention in accordance with claim 6,
wherein the windings of the plurality of winding means are interconnected so as to form at least one group of interconnected drive windings coupled to said driving means and at least one group of interconnected sense windings coupled to said sensing means.

8. The invention in accordance with claim 7,
wherein the windings of said plurality of winding means are disposed in a plurality of adjacent planes with each group being disposed in one of said planes and with corresponding windings having like relative positions.

9. The invention in accordance with claim 8,
wherein each plane is comprised of a sheet of insulative material having its respective group of interconnected windings provided thereon.

10. The invention in accordance with claim 8,
wherein each group of interconnected drive windings has its drive windings interconnected so that each drive winding has the same relative polarity, and
wherein each group of interconnected sense windings has its sense winding interconnected so that half of its sense windings have one relative polarity and the other half the opposite relative polarity.

11. The invention in accordance with claim 10,
wherein the windings in each group are connected in series.

12. The invention in accordance with claim 7,
wherein the windings in each group and their interconnections are chosen so that the actuation of a key results in a unique combination of signals being coupled to said sensing means.

13. The invention in accordance with claim 12,
wherein a plurality of groups of interconnected sense windings are provided coupled to said sensing means, and
wherein said sensing means includes a sensing means for each group of sense windings.

14. The invention in accordance with claim 12,
wherein a plurality of groups of interconnected drive windings are provided, and
wherein switch logic means are also provided for sequentially coupling said driving means to the groups of interconnected drive winding.

15. In apparatus for encoding information,
a base structure,
a plurality of rows of keys, each row comprising an integral sheet of spring metal stock shaped so as to form a planar supporting portion by which the row is secured to said base structure, said supporting portion having elongated spaced-parallel key-operating members depending substantially perpendicularly therefrom and each being individually displaceable in a direction substantially perpendicular to the plane of said supporting portion,
each key-operating member including a cap-receiving portion at one end and an eddy current shorting element at the other end, and
encoding means provided adjacent the eddy current shorting elements of said rows of keys so that the actuation of a key causes its respective key-operating member to move toward said encoding means to bring its respective eddy current shorting element into proximity to a unique respective portion of said encoding means which in response to this proximity produces an electrical output signal uniquely representative of the actuated key.

16. The invention in accordance with claim 15,
wherein said encoding means comprises a plurality of stacked printed circuit boards each having a unique pattern of interconnected windings provided thereon and driving and sensing means cooperating therewith.

17. A method of electrically encoding information entered into a keyboard having a plurality of keys, said method comprising
providing an eddy current shorting element coupled to each key and movable in response to actuation thereof,
providing a plurality of close proximity windings corresponding to each key of the keyboard and located so that the actuation of the corresponding key causes the respective eddy current shorting element to move into proximity thereto, each plurality of close proximity windings including at least one drive winding and one sense winding, electrically energizing the drive windings of the keys, and sensing the reduced coupling occurring between the drive and sense windings corresponding to an actuated key because of the proximity of the respective eddy current shorting element for producing in response thereto an electrical output uniquely representative of the actuated key.

18. In apparatus for encoding information, a plurality of individually actuatable mechanical elements, a plurality of electrical winding means arranged in predetermined magnetically coupled groups, mechanical means coupled to said elements and responsive to actuation of an element for producing an eddy current effect on a unique corresponding group of winding means for causing a detectable change to occur in the magnetic coupling therebetween, and electrical means coupling said winding means and responsive to said detectable change for producing an electrical indication representative of the actuated mechanical element.

19. The invention in accordance with claim 18, wherein said mechanical means coupled to said elements comprises conductive means responsive to the actuation of an element for causing a change in the positioning of conductive material in the vicinity of its corresponding group of winding means so as to produce said detectable change.

20. The invention in accordance with claim 19, wherein said conductive means comprises a conductive element mechanically coupled to each element which upon actuation of the element is caused to move into closer proximity to the group of winding means corresponding thereto.

21. The invention in accordance with claim 19, wherein said mechanical elements comprise keys of a keyboard with each key corresponding to a respective one said groups.

* * * * *